(12) United States Patent
Cloft

(10) Patent No.: US 8,769,924 B2
(45) Date of Patent: Jul. 8, 2014

(54) GAS TURBINE ENGINE ASSEMBLY INCLUDING ACCESSORY COMPONENTS WITHIN THE NACELLE

(75) Inventor: Thomas G. Cloft, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1039 days.

(21) Appl. No.: 12/129,990

(22) Filed: May 30, 2008

(65) Prior Publication Data

US 2009/0293497 A1 Dec. 3, 2009

(51) Int. Cl.
*F02K 3/02* (2006.01)

(52) U.S. Cl.
USPC ......... 60/226.1; 415/220; 137/15.1; 244/53 B

(58) Field of Classification Search
USPC ........ 60/39.83, 39.093, 226.1, 262; 137/15.1; 244/53 B, 134 R, 134 C, 134 D, 134 B; 415/220, 222, 223, 214.1; 181/213, 181/214, 222
See application file for complete search history.

(56) References Cited

U.S. PATENT DOCUMENTS

| | | | | |
|---|---|---|---|---|
| 3,662,556 A | * | 5/1972 | Poucher et al. | 60/226.1 |
| 3,981,466 A | * | 9/1976 | Shah | 244/134 R |
| 4,417,848 A | * | 11/1983 | Dembeck | 415/121.2 |
| 4,452,565 A | * | 6/1984 | Monhardt et al. | 415/9 |
| 4,688,745 A | * | 8/1987 | Rosenthal | 244/134 R |
| 4,722,184 A | * | 2/1988 | Chaplin et al. | 60/226.1 |
| 4,791,782 A | * | 12/1988 | Seed | 60/226.1 |
| 5,058,617 A | | 10/1991 | Stockman et al. | |
| 5,083,426 A | | 1/1992 | Layland | |
| 5,101,621 A | | 4/1992 | Mutch | |
| 5,259,724 A | | 11/1993 | Liston et al. | |
| 5,400,984 A | * | 3/1995 | Arnold et al. | 244/134 B |
| 5,427,332 A | * | 6/1995 | Rauckhorst et al. | 244/134 A |
| 5,516,257 A | * | 5/1996 | Kasprow et al. | 415/9 |
| 5,524,847 A | | 6/1996 | Brodell et al. | |
| 5,867,979 A | * | 2/1999 | Newton et al. | 60/226.1 |
| 5,941,061 A | * | 8/1999 | Sherry et al. | 60/798 |
| 6,131,855 A | * | 10/2000 | Porte | 244/134 B |
| 6,179,249 B1 | | 1/2001 | Canadas | |
| 6,202,403 B1 | * | 3/2001 | Laborie et al. | 60/39.83 |
| 6,227,485 B1 | * | 5/2001 | Porte | 244/54 |
| 6,328,258 B1 | * | 12/2001 | Porte | 244/53 B |
| 6,360,989 B1 | | 3/2002 | Maguire | |
| 6,585,191 B2 | * | 7/2003 | Andre et al. | 244/134 B |
| 6,619,913 B2 | | 9/2003 | Czachor et al. | |
| 6,725,542 B1 | | 4/2004 | Maguire | |

(Continued)

FOREIGN PATENT DOCUMENTS

GB 2259287 A 10/1993

OTHER PUBLICATIONS

Extended European Search Report for Application No. EP 09 25 1017 mailed Feb. 9, 2010.

(Continued)

*Primary Examiner* — William H Rodriguez
(74) *Attorney, Agent, or Firm* — Carlson, Gaskey & Olds

(57) ABSTRACT

A gas turbine engine assembly includes an inlet lip assembly, a fan containment case, and a front flange. The fan containment case surrounds a fan section and is positioned downstream from the inlet lip assembly. The front flange is mounted between the inlet lip assembly and the fan containment case and is positioned upstream from the fan section.

20 Claims, 3 Drawing Sheets

(56) References Cited

U.S. PATENT DOCUMENTS

| | | | |
|---|---|---|---|
| 6,814,541 B2* | 11/2004 | Evans et al. | 415/200 |
| 6,896,099 B2 | 5/2005 | Porte et al. | |
| 6,920,958 B2* | 7/2005 | Harrison | 181/214 |
| 6,969,029 B2* | 11/2005 | Crouch et al. | 244/134 R |
| 7,090,165 B2 | 8/2006 | Jones et al. | |
| 7,131,612 B2 | 11/2006 | Baptist et al. | |
| 7,398,641 B2 | 7/2008 | Stretton et al. | |
| 7,469,862 B2* | 12/2008 | Layland et al. | 244/134 D |
| 7,588,212 B2* | 9/2009 | Moe et al. | 244/134 D |
| 7,631,838 B2 | 12/2009 | Layland et al. | |
| 7,739,865 B2* | 6/2010 | Prasad et al. | 60/226.1 |
| 7,886,518 B2* | 2/2011 | Moniz et al. | 60/226.1 |
| 7,900,872 B2* | 3/2011 | Sternberger | 244/134 C |
| 7,941,993 B2* | 5/2011 | Siebert | 60/39.093 |
| 8,371,009 B2* | 2/2013 | Xie et al. | 29/402.11 |
| 2003/0156940 A1* | 8/2003 | Czachor et al. | 415/119 |
| 2004/0094359 A1* | 5/2004 | Porte et al. | 181/214 |
| 2005/0006529 A1* | 1/2005 | Moe et al. | 244/134 D |
| 2006/0237582 A1* | 10/2006 | Layland et al. | 244/53 R |
| 2007/0163229 A1 | 7/2007 | Prasad et al. | |
| 2007/0241257 A1 | 10/2007 | Eleftheriou et al. | |
| 2009/0064684 A1* | 3/2009 | Cloft | 60/796 |
| 2009/0092482 A1 | 4/2009 | Winter | |
| 2009/0134272 A1 | 5/2009 | Vauchel | |
| 2010/0068051 A1* | 3/2010 | Cloft et al. | 415/220 |
| 2010/0176250 A1* | 7/2010 | Porte | 244/53 B |
| 2011/0068222 A1* | 3/2011 | Vauchel et al. | 244/1 N |

OTHER PUBLICATIONS

Extended European Search Report for Application No. EP 12 17 1771 dated Sep. 25, 2012.

* cited by examiner

GAS TURBINE ENGINE ASSEMBLY INCLUDING ACCESSORY COMPONENTS WITHIN THE NACELLE

BACKGROUND OF THE INVENTION

This disclosure relates generally to a gas turbine engine, and more particularly to a gas turbine engine assembly including a relocated front flange.

Gas turbine engines, such as turbofan gas turbine engines, typically include a core engine having a fan section, a compressor section, a combustor section and a turbine section. During operation, air is pressurized in the compressor section and mixed with fuel in the combustor section for generating hot combustion gases. The hot combustion gases flow through the turbine section which extracts energy from the hot combustion gases to power the compressor section and drive the fan section.

The core engine includes an engine casing structure that includes a fan containment case (FCC) and a fan case downstream from the FCC. The FCC and the fan case surround the fan section of the gas turbine engine and contain the fan section components in the event of a fan blade out event. A fan blade out event occurs where a fan blade of the fan section becomes dislodged from the fan section and strikes the FCC.

The core engine is generally surrounded by a nacelle assembly that is annularly disposed about the core engine. The nacelle assembly and the engine casing structure cooperate to assemble the gas turbine engine. Typically, an inlet lip assembly of the nacelle assembly is attached to an A-flange disposed about the fan section of the core engine. The FCC is attached to an opposite side of the A-flange from the inlet lip assembly. The A-flange permits assembly/disassembly of the inlet lip assembly from the FCC. A B-flange is typically positioned downstream from the A-flange and permits assembly/disassembly of the FCC from the fan case.

The current location of the A-flange about the fan section necessitates that the inlet lip assembly include forward and aft bulkheads. The bulkheads provide radial stiffness and support to the inlet lip assembly. The bulkheads add additional weight and expense to the gas turbine engine assembly, and may negatively affect gas turbine engine efficiency and fuel consumption.

In addition, an engine electronic control is typically mounted aft of the fan containment case, such as on the fan case. The fan case provides a relatively cool mounting environment that is readily accessible for maintenance through fan cowl doors positioned on the nacelle assembly. Disadvantageously, modern gas turbine engines include engine electronic controls of increased size, and include a reduced amount of mounting space aft of the FCC. Therefore, modern gas turbine engines are becoming more difficult and expensive to assemble.

Accordingly, it is desirable to provide a gas turbine engine assembly that is of reduced weight, reduced complexity, and that may be assembled at a reduced cost.

SUMMARY OF THE INVENTION

A gas turbine engine assembly includes an inlet lip assembly, a fan containment case, and a front flange. The fan containment case surrounds a fan section and is positioned downstream from the inlet lip assembly. The front flange is mounted between the inlet lip assembly and the fan containment case and is positioned upstream from the fan section.

A method of assembling a gas turbine engine includes positioning a front flange upstream from a fan section of the gas turbine engine, mounting an inlet lip assembly to a first side of the front flange, and mounting a fan containment case to a second side of the front flange.

A gas turbine engine includes a nacelle assembly, a core engine, a fan containment case and a cavity. The core engine is partially surrounded by the nacelle assembly and includes a fan section, a compressor section, a combustor section, and a turbine section. The fan containment case is positioned about the fan section. The cavity annularly extends between the nacelle assembly and the fan containment case. The cavity extends upstream from the fan section and mountably receives an engine accessory.

The various features and advantages of this disclosure will become apparent to those skilled in the art from the following detailed description. The drawings that accompany the detailed description can be briefly described as follows.

DETAILED DESCRIPTION OF THE EXAMPLE EMBODIMENT

Figure 1:
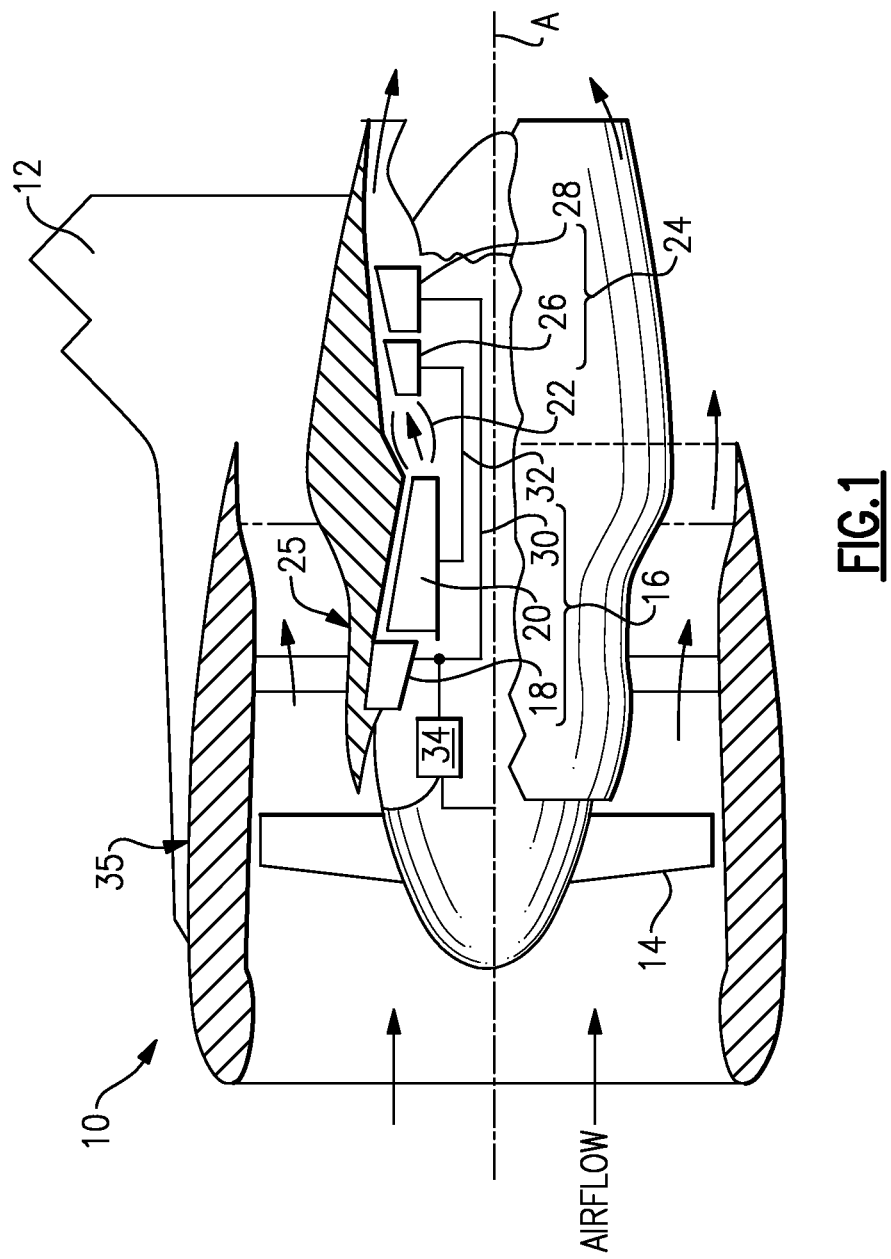
FIG. 1 illustrates a general perspective view of a gas turbine engine.

FIG. 1 illustrates a gas turbine engine 10 suspended from an engine pylori 12 as is typical of an aircraft designed for subsonic operation. In one example, the gas turbine engine 10 is a turbofan gas turbine engine. The gas turbine engine 10 includes a core engine 25. The core engine 25 includes a fan section 14, a compressor section 16 having a low pressure compressor 18 and a high pressure compressor 20, a combustor section 22, and a turbine section 24 having a high pressure turbine 26 and a low pressure turbine 28. A low speed shaft 30 rotationally supports the low pressure compressor 18 and the low pressure turbine 28. The low speed shaft 30 also drives the fan section 14 either directly, or through a gear train 34, for example. A high speed shaft 32 rotationally supports the high pressure compressor 20 and the high pressure turbine 26. The low speed shaft 30 and the high speed shaft 32 rotate about a longitudinal centerline axis A of the gas turbine engine 10.

During operation, airflow is drawn into the gas turbine engine 10 by the fan section 14 and is pressurized in the compressor section 16. Fuel is mixed with pressurized air and combusted within the combustor section 22. The combustion gases are discharged through the turbine section 24 which extracts energy therefrom for powering the compressor section 16 and the fan section 14.

A nacelle assembly 35 at least partially surrounds the core engine 25. The nacelle assembly 35 protects the core engine 25 and provides a smooth flow surface for incoming airflow. The nacelle assembly 35 includes an inlet lip assembly 52 (See FIG. 4) having a contoured profile for directing airflow to the fan section 14.

Of course, this view is highly schematic. It should be understood that the features and example illustrations presented herein are not limited to a turbofan gas turbine engine. That is, the present disclosure is applicable to any engine architecture.

Figure 2:
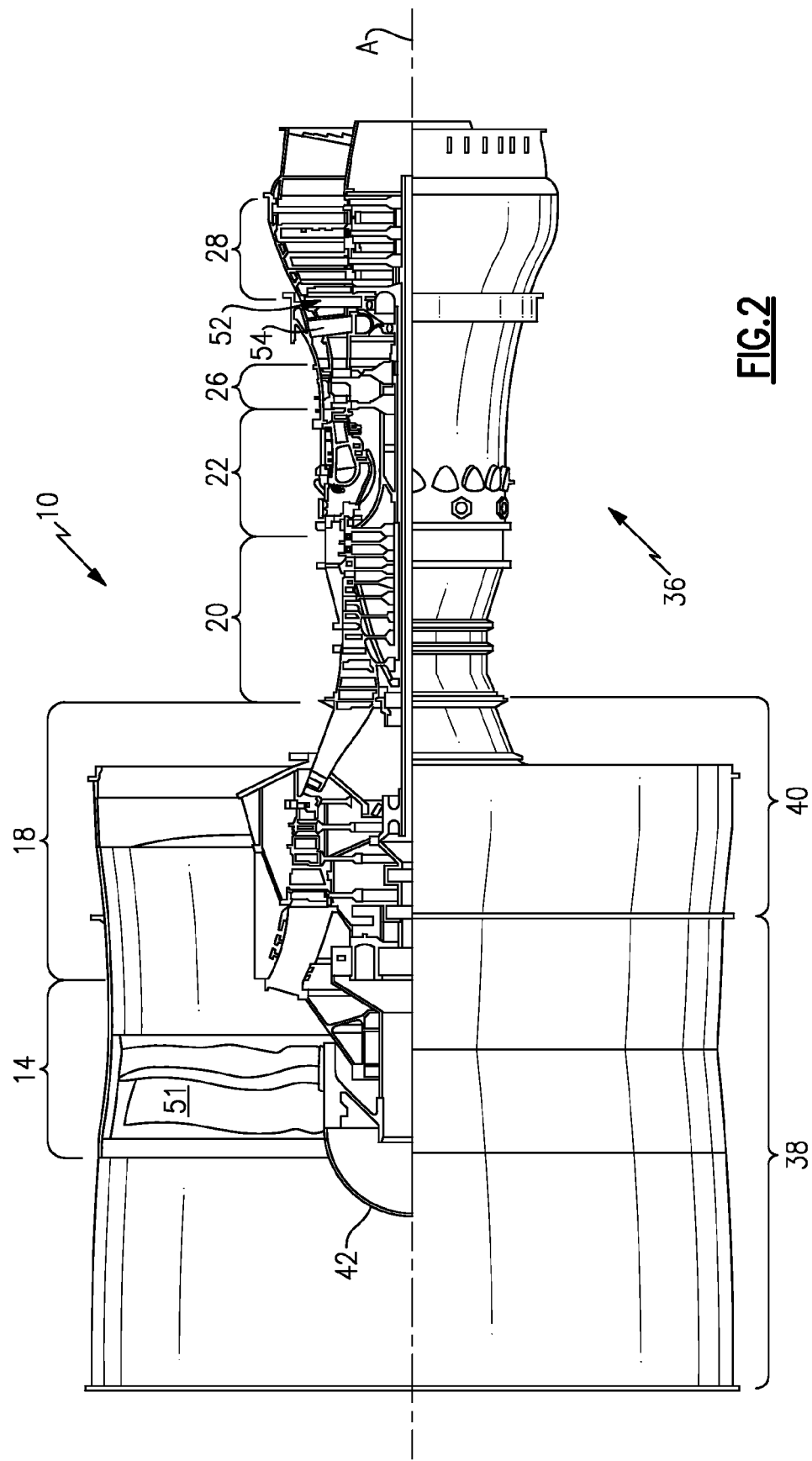
FIG. 2 illustrates a partial sectional view of an example gas turbine engine having an engine casing structure on the lower half thereof.

FIG. 2 illustrates an engine casing structure 36 of the example gas turbine engine 10. The engine casing structure 36 includes a fan containment case (FCC) 38 and a fan case 40. The fan case 40 is positioned downstream from the FCC 38. The FCC 38 and the fan case 40 surround the fan section 14 and protect the gas turbine engine 10 from damage that may be caused during certain flight events, such as a fan blade out event. A fan blade out event occurs where a fan blade 51 of the fan section 14 becomes dislodged from the fan section 14 and strikes the FCC 38. It should be understood that the engine casing structure 36 would include numerous other case sections.

In this example, the FCC 38 extends upstream from the fan section 14. In another example, at least a portion of the FCC 38 extends upstream from a nose cone 42 of the fan section 14. That is, the example FCC 38 extends both forward and aft of the fan section 14.

Figure 3:
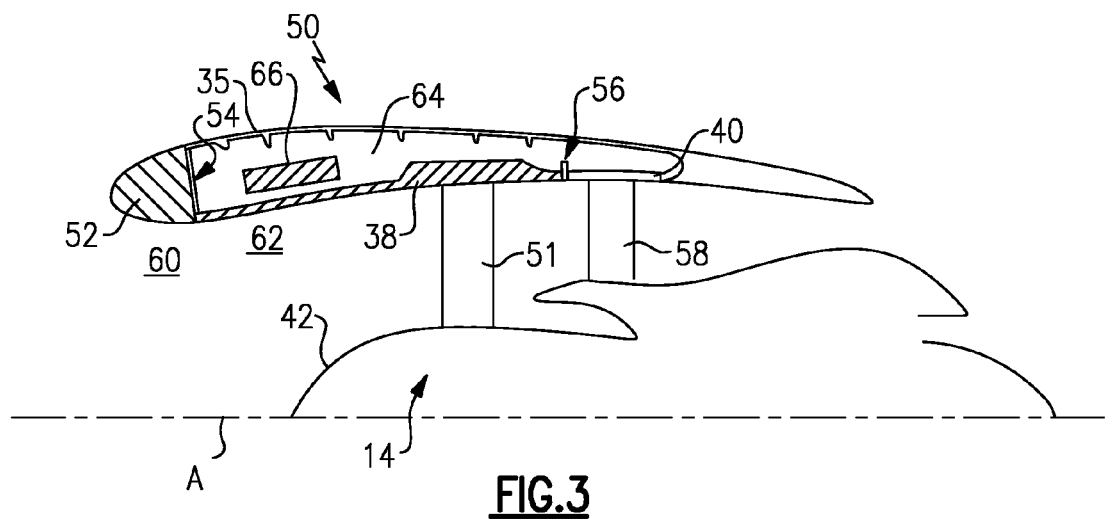
FIG. 3 illustrates a cross-sectional view of an example gas turbine engine assembly.

FIG. 3 illustrates an example gas turbine engine assembly 50. The gas turbine engine assembly 50 includes an inlet lip assembly 52, the fan containment case 38, a front flange 54, and a rear flange 56. In one example, the front flange 54 represents the A-flange of the gas turbine engine 10, and the rear flange 56 represents the B-flange of the gas turbine engine 10. In another example, the front flange 54 and the rear flange 56 are axial flanges. The front flange 54 is positioned entirely upstream from the fan section 14. In one example, the front flange 54 is positioned upstream from the nose cone 42. In yet another example, the rear flange 56 is positioned between the fan section 14 and a fan exit guide vane 58.

Repositioning the front flange 54 at a position upstream from the fan section 14 provides an extended fan containment case 38 as compared to prior art gas turbine engines that include a front flange 54 positioned directly adjacent to a fan section 14. The inlet lip assembly 52 is attached to the front flange 54 on an upstream side 60 of the front flange 54. The fan containment case 38 is attached to a downstream side 62 of the front flange 54. In one example, the inlet lip assembly 52 and the FCC 38 are bolted to the front flange 54. The front flange 54 permits assembly/disassembly of the inlet lip assembly 52 from the fan containment case 38. That is, the inlet lip assembly 52 is removable from the gas turbine engine assembly 50.

The inlet lip assembly 52 may include a plurality of advanced technology devices. For example, the inlet lip assembly 52 includes an electrical de-ice system.

The fan containment case 38 extends between the front flange 54 and the rear flange 56. The fan containment case 38 is assembled/disassembled from the fan case 40 at the rear flange 56. That is, the gas turbine engine assembly 50 may be assembled/disassembled at two points—the front flange 54 and the rear flange 56. No other bulkheads or radial stiffeners are required. Therefore, the gas turbine engine assembly 50 provides significant weight reductions for the gas turbine engine 10.

Figure 4:
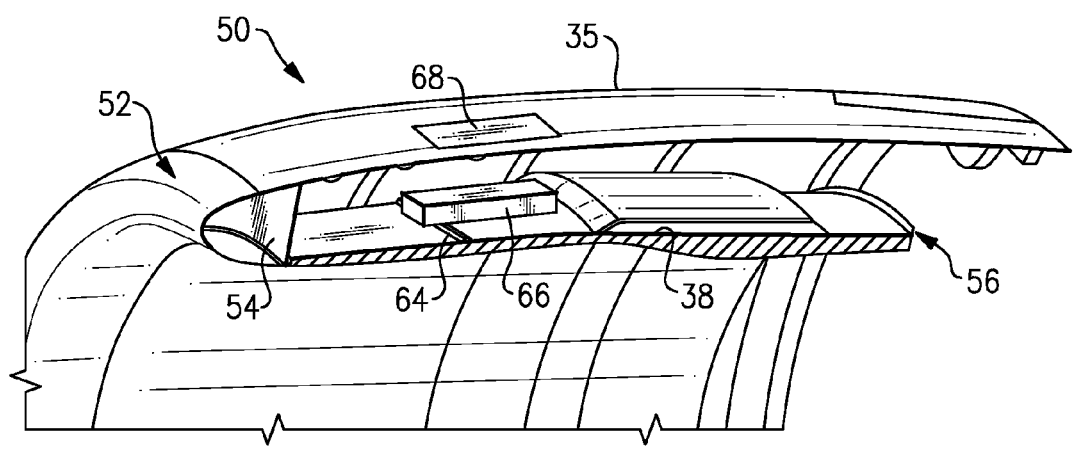
FIG. 4 illustrates the example gas turbine engine assembly illustrated in FIG. 3 including a cavity for housing an engine accessory.

FIG. 4 illustrates a cavity 64 that annularly extends between the nacelle assembly 35 and the FCC 38. In one example, the cavity 64 extends from the front flange 54 to the rear flange 56. In another example, the cavity 64 extends from a position forward of the front flange 54 to a position downstream of the fan exit guide vane 58 (See FIG. 3). It should be understood that the cavity 64 shown in FIG. 4 is illustrated enlarged to better illustrate its design and function. A worker of ordinary skill in the art would be able to select an appropriate size, volume etc. for the cavity 64.

The cavity 64 provides an additional volume for mounting an engine accessory 66. The increased volume is a direct result of the repositioning of the front flange 54 upstream from the fan section 14 and removal of bulkheads and radial stiffeners between the front flange 54 and the rear flange 56. In one example, the engine accessory 66 is an engine electronic control (EEC). It should be understood that other engine accessories may be mounted within the cavity 64. The nacelle assembly includes a door 68 that may be opened and closed to provide access to the engine accessory 66.

Incorporating a removable inlet lip assembly 52 with an extended FCC 38 improves maintainability both on-wing and in-shop for maintenance purposes. Repositioning the front flange 54 upstream from the fan section 14 avoids a weight and cost penalty associated with adding additional assembly flanges. In addition, mounting the engine accessory 66 within the cavity 64 provides cooler environmental temperatures and lower engine vibration levels that improve the reliability of the engine accessories 66.

The foregoing description shall be interpreted as illustrative and not in any limiting sense. A worker of ordinary skill in the art would understand that certain modifications would come within the scope of this disclosure. For these reasons, the following claims should be studied to determine the true scope and content of this disclosure.

What is claimed is:

1. A nacelle assembly, comprising:
    an inlet lip assembly;
    a fan containment case surrounding a fan section and positioned downstream from said inlet lip assembly;
    a front flange mounted between said inlet lip assembly and said fan containment case, wherein said front flange is positioned upstream from a nose cone of said fan section; and
    said fan containment case attached to a downstream side of said front flange.

2. The assembly as recited in claim 1, wherein said inlet lip assembly is removably attached to an upstream side of said front flange.

3. The assembly as recited in claim 1, comprising an engine accessory mounted to said fan containment case at a position that is upstream from said fan section.

4. The assembly as recited in claim 3, wherein said engine accessory includes an engine electronic control.

5. The assembly as recited in claim 3, wherein said engine accessory is mounted within a cavity.

6. The assembly as recited in claim 5, wherein said cavity extends from a position upstream from said front flange to a position downstream of said fan section.

7. The assembly as recited in claim 5, wherein said cavity is free of bulkheads and stiffeners between said front flange and a rear flange.

8. The assembly as recited in claim 7, wherein said cavity extends aft of said rear flange.

9. The assembly as recited in claim 1, comprising a rear flange positioned between said fan section and a fan exit guide vane.

10. The assembly as recited in claim 9, wherein said fan containment case extends from said front flange to said rear flange.

11. A method of assembling a gas turbine engine, comprising the steps of:
    a) positioning a front flange such that the front flange is positioned upstream from a nose cone of a fan section;
    b) mounting an inlet lip assembly to a first side of the front flange;
    c) mounting a fan containment case to a second side of the front flange; and d) mounting a rear flange downstream of the front flange at a position between the fan section and a fan exit guide vane.

12. The method as recited in claim 11, wherein said step b) includes the step of:
    removably mounting the inlet lip assembly to the first side of the front flange.

13. The method as recited in claim 11, wherein the fan containment case extends from the front flange to the rear flange.

14. The method as recited in claim 11, comprising the steps of:
    e) disassembling the inlet lip assembly from the fan containment case at the front flange; and
    f) disassembling the fan containment case from a fan case at the rear flange.

15. A nacelle assembly, comprising:
    an inlet lip assembly;
    a fan containment case surrounding a fan section and positioned downstream from said inlet lip assembly;
    a front flange mounted between said inlet lip assembly and said fan containment case, wherein said front flange is positioned upstream from a nose cone of said fan section; and
    an engine accessory mounted to said fan containment case at a position that is upstream from said fan section.

16. A nacelle assembly, comprising:
    an inlet lip assembly;
    a fan containment case surrounding a fan section and positioned downstream from said inlet lip assembly;
    a front flange mounted between said inlet lip assembly and said fan containment case, wherein said front flange is positioned upstream from a nose cone of said fan section; and
    a rear flange positioned between said fan section and a fan exit guide vane.

17. The assembly as recited in claim 16, wherein said front flange spans a distance between a radially outer wall and a radially inner wall of said nacelle assembly.

18. The assembly as recited in claim 16, comprising a cavity that extends from said front flange to said rear flange.

19. The assembly as recited in claim 18, comprising an engine accessory mounted within an open volume defined by said cavity, said open volume free of bulkheads and stiffeners between said front flange and said rear flange.

20. The assembly as recited in claim 19, comprising a door configured to provide access to said engine accessory.

\* \* \* \* \*